United States Patent [19]
Lefevre

[11] 3,865,911
[45] Feb. 11, 1975

[54] COOLING TOWER TYPE WASTE HEAT EXTRACTION METHOD AND APPARATUS

[75] Inventor: Marcel R. Lefevre, Bernardsville, N.J.

[73] Assignee: Research-Cottrel, Inc., Bridgewater Township, N.J.

[22] Filed: May 3, 1973

[21] Appl. No.: 356,721

[52] U.S. Cl............ 261/140, 261/DIG. 11, 261/111, 165/47
[51] Int. Cl. ...................... F02m 15/00, F02m 29/04
[58] Field of Search .......... 261/140, 146, 148, 149, 261/151, 152, 111, DIG. 11; 165/47

[56] References Cited
UNITED STATES PATENTS

| | | |
|---|---|---|
| 2,064,808 | 12/1936 | Beran........................... 261/DIG. 11 |
| 3,349,839 | 10/1967 | Priestley............................ 261/148 |
| 3,378,239 | 4/1968 | Engalitcheff, Jr............ 261/DIG. 11 |
| 3,423,078 | 1/1969 | May............................ 261/DIG. 11 |
| 3,685,579 | 8/1972 | Spaugemacher............. 261/DIG. 11 |
| 3,687,425 | 8/1972 | Katz............................ 261/DIG. 11 |
| 3,782,451 | 1/1974 | Cates ................................... 261/111 |
| 3,785,121 | 1/1974 | Phelps................................. 261/149 |

Primary Examiner—Harrison L. Hinson
Attorney, Agent, or Firm—Harold L. Stowell

[57] ABSTRACT

A counterflow cooling tower system and method of operation for extraction of waste heat from industrial plants is provided which includes means for the controlled reduction of vapor plume emission and effective space utilization of serially arranged wet and dry cooling sections.

12 Claims, 4 Drawing Figures

PATENTED FEB 1 1 1975

3,865,911

COOLING TOWER TYPE WASTE HEAT EXTRACTION METHOD AND APPARATUS

BACKGROUND OF THE INVENTION

Waste heat from industrial plants such as condensed steam from turbine-type electrical power producing plants has been cooled or extracted by water cooling, air cooling and combination water and air cooling. While water cooling of condensed exhaust steam, with the water being taken from rivers and wells was once an important cooling practice, the shortage of water and thermal pollution of rivers thereby has substantially reduced this practice and air cooling of hot water is only practical during the cool or cold seasons. For these and other reasons, new installations have been resorting to wet and dry cooling towers with the dry cooling towers being used during cool or cold air temperature seasons and the wet towers being used the other times.

In many such systems the dry portion or section is completely useless in summer, even though the dry portion generally represents the largest portion of the investment cost. Combination wet and dry systems also present difficulties due to improper mixing of the wet air coming from the wet section and the dry air coming from the dry section whereby the exhaust gas still produces very substantial and objectionable vapor plumes. Also in known combination wet and dry systems, severe corrosion problems and scale deposit problems have been experienced.

THE PRESENT INVENTION

The present invention is directed to new and useful counterflow, combination wet and dry waste heat cooling towers having a single flow path for the cooling air and which towers are provided with novel vapor plume reduction or elimination means which may be automatically or manually controlled.

It is a particular object of the invention to provide such a counterflow cooling tower combination of wet and dry sections which are installed in series in both water and airflow circuits and such a tower provided with control means such that the system can be operated as a pure wet tower with maximum cooling capability or as a pure dry tower with complete plume elimination or anywhere between such two extremes.

It is therefor another object to provide such a system that satisfies the requirements of plume reduction or elimination during cold, wet weather conditions without affecting the cooling capability of the system during hot, dry summer conditions.

In general, the invention may be defined as comprising a hot liquid cooling tower, means for directing air through the tower from its lower end upwardly, a first normally dry cooling section adjacent the upper end of the tower, first liquid spray means above said first cooling section, a second normally wet cooling section adjacent the lower end of the tower, second liquid spray means between the first and second cooling sections, a cooled liquid sump at the bottom of the tower, and valve means for selectively directing a source of hot liquid to be cooled to at least one of said first and second spray means, and first and second cooling sections.

BRIEF DESCRIPTION OF THE DRAWING

The invention will be more particularly described in reference to the accompanying drawing wherein.

SPECIFIC DESCRIPTION AND EXAMPLES OF THE INVENTION

Figure 1:
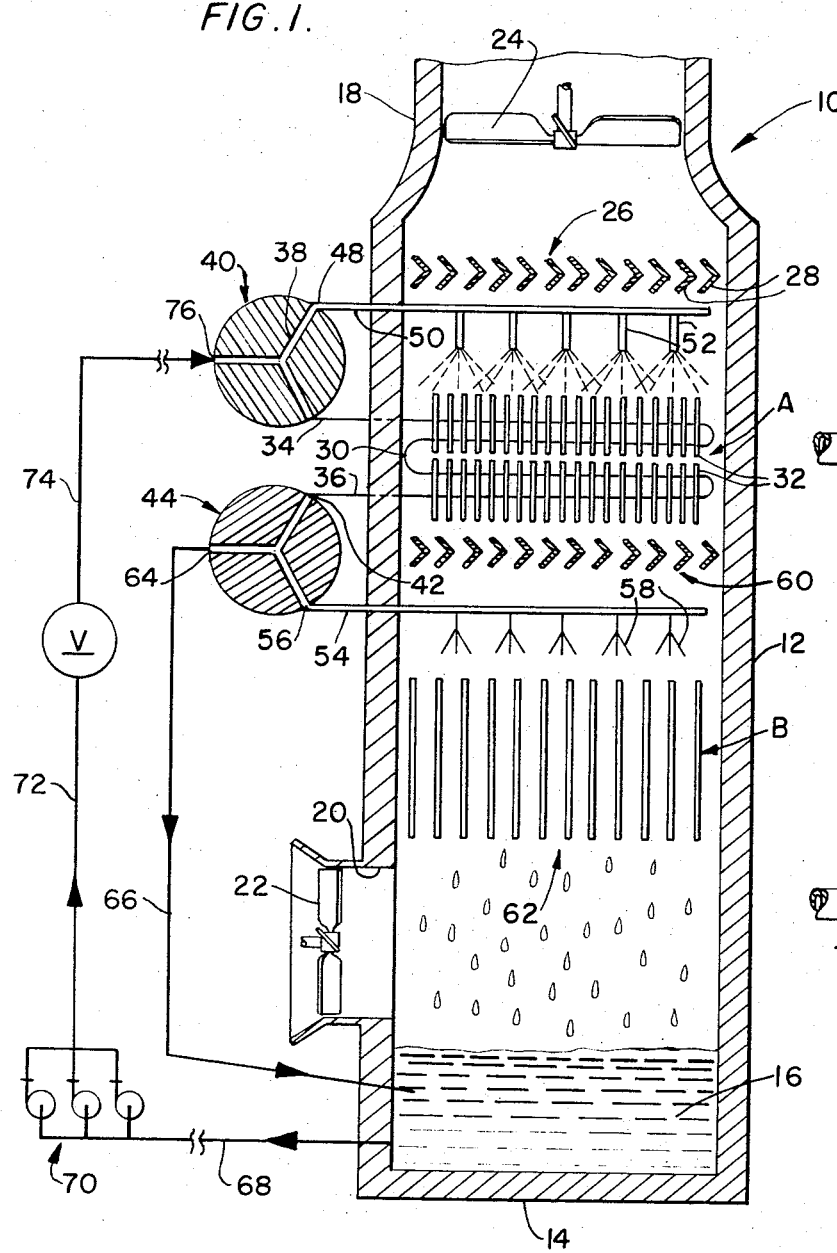
FIG. 1 is a diagramatic vertical sectional view of a system embodying the concepts of the invention.

Referring to the drawing and in particular to FIG. 1 thereof, 10 generally designates a cooling tower constructed in accordance with the teachings of the present invention. The tower 10 includes side wall 12 and bottom 14 in the form of a sump for the cooled and cooling water 16. The top is open as at 18 for the exhaust of cooling air, while an air inlet opening 20 is formed in the side wall 12. The tower structures 12–18 hereinabove set for may be of various configurations and formed of conventional materials as the tower shown is for illustration purposes only. Further, for example, the tower may be of the self-venting type or the tower may employ one or more ventilators such as illustrated at 22 at the air inlet opening 20 and 24 at the outlet 18 or the tower may have a combination of natural and force draft ventilation without departing from the concepts of the present invention.

Within and extending across the tower, is mounted first a conventional hook-type mist or water droplet eliminator 26 which in the drawing comprise a plurality of horizontally positioned, spaced, parallel angle members 28 which assist in removing air carried water drops as the air passes thereabout in its tortuous path through the unit 26.

Below the mist eliminator 26 is a first cooling section A and serially there below is a second cooling section B.

The first cooling section A comprises pipes 30 which may be provided with suitable finning 32. The use of bare tubes rather than fin-type tubes has the advantage of better corrosion resistance and the finless tubes may be formed of noncorrodible material such as plastic or the finless tubes may be plastic-coated.

The cooling pipes or coil 30 has an inlet pipe 34 and an outlet pipe 36. The hot water inlet pipe 34 is connected to one port 38 of a three-way valve 40 while the outlet pipe 36 is connected to port 42 of the three-way valve 44.

Port 48 of valve 40 is connected to a header 50 which extends into the cooling tower and is provided with a plurality of outlet pipes 52 each terminating in a spray head directed toward the cooling coil of cooling section A.

Below the first cooling section A is mounted a second header 54 which is connected to port 56 of three-way valve 44. The header 54 like header 50 is provided with a plurality of outlet pipes 58 each terminating in a spray head directed toward cooling section B.

Between the second header 54 and the lower end of the first cooling section A is mounted a second mist eliminator 60 which may be identical to the mist eliminator 26 described hereinbefore.

The second cooling section B, in the illustrated form of the invention, comprises a plurality of vertically directed spaced, parallel plates of conventional wetted surface cooling tower form generally designated 62.

As is known in the art, the "wet" section, section B may be operated without the wet surface plates and the contact between the air and liquid to be cooled is then by means of the droplets produced by the sprays positioned above the section.

The third port 64 of three-way valve 44 is connected to the sump 16 at the bottom of the cooling tower via pipe 66.

To complete the system, the lower end of the sump 16 is provided with an outlet pipe 68 connected to pump station 70. The cooled liquid from station 70 is pumped via pipe 72 to the needed utility which may comprise a steam powered electric generating plant generally designated V and hot water or liquid from the utility is pumped via pipe 74 to the third port 76 of three-way valve 40.

Hot water to be cooled from source V may be directed via valve 40:

a. to sprays 52 and cooling section A, as illustrated in FIG. 1;
b. to sprays 52 only or
c. to cooling section A only.

In respect to valve 44, partially cooled water or other liquid from pipe 36 of cooling section A may be directed as follows:

d. part to sprays 58 and part to the sump 16;
e. only to sprays 58; or
f. only to sump 16.

Figure 2A:
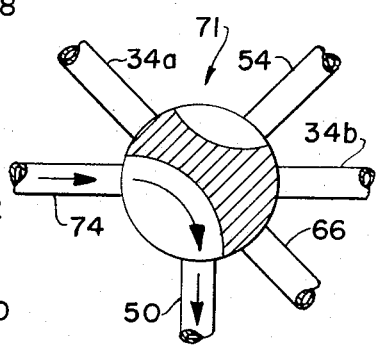
FIGS. 2a, 2b and 2c illustrate control valve settings for summer, mid-season and winter tower operation respectively utilizing a single valve rather than two valves shown in FIG. 1.
Figure 2B:
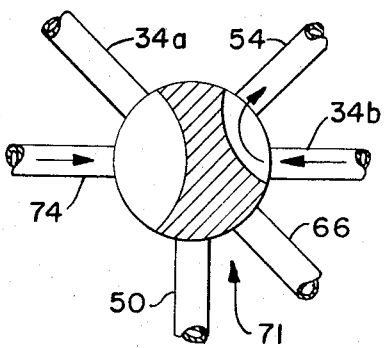
Figure 2C:
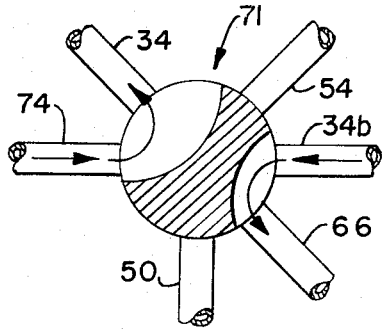

Similar fluid distribution of the liquid to be cooled may be obtained by means of a single six-way valve generally designated 71, as illustrated in FIGS. 2a, 2b and 2c. Referring to these figures, pipe 74, as in FIG. 1, directs hot water to the valve from source V; pipe 54 directs partially cooled liquid to the valve from cooling section A; pipe 66 directs liquid from the valve to the sump 16; and pipe 34 of FIG. 1 is illustrated in FIGS. 2a, 2b and 2c as pipes 34a and 34b each of which is connected to inlet pipe 34 for directing liquid to be cooled to cooling section A.

EXAMPLES OF OPERATION OF THE COOLING SYSTEM

I. Summer Operation

During hot, dry weather in the summer, the natural plume of a wet-type cooling tower is rather limited and very often the plume is of such small extent that it does not leave the boundries of the industrial property and consequently it does not create a nuisance.

At the same time maximum cooling capabilities of the cooling tower are required to cool the hot water from the source V and the tower will be operated as follows:

Hot water from source V is directed by either three-way or six-way valve 40 or 71 to sprays 52 only via pipe 50 so that all of the water to be cooled is passed over cooling section A. The outside surface of this section is thus used as a wet cooler. The water passing over section A continues its downward fall, as air is moved in counterflow direction by one or both of the fans 22 and 24 or by natural draft in a natural draft tower, onto the drift eliminator which now also acts as a wet cooler. Thence the water reaches the cooling section B where final cooling takes place and then falls into the sump 16 for reuse by source or utilization V. Thus it will be seen that all surfaces of the tower are utilized as wet coolers when maximum cooling is required and air is in contact with such surfaces during all its passage through the tower.

It is to be noted that the above described method of operation can also be used occasionally, during non-summer operation, to clean section A, the normally dry section of salt and other deposits that might have collected during other modes of operation as to be more fully described hereinafter.

II. Mid-Season Operation

During moderately cold and humid weather conditions, the cooling tower is operated as follows:

Hot water to be cooled is directed by valve 40 to inlet pipe 34 of section A and the partially cooled water leaving section A via pipe 36 is directed by valve 44 to pipe 54 and spray heads 58 to the wet section B thence the cooled water is collected in sump 16.

During mid-season operation, if the six-way valve 71 is employed in the system, such valve is set as illustrated in FIG. 2b to bring about the hereinabove described water flow path.

In this mode of operation, air passing through the tower is first in contact with the water to be cooled in section B, passes through the lower drift eliminator 60 where water droplets are separated from the air flow.

Air that passes section A removes heat from the water flowing through pipes 30 by indirect contact. Such further heating of the air will substantially reduce or eliminate any vapor plume as the heated air leaves the tower.

It is to be noted that, should conditions warrant, an additional step of plume reduction can be achieved by reducing the flow of hot water entering section B via sprays 58 by shutting off one or more of the circulating pumps in pump section 70.

When it is not possible or advisable to shut-off one or more of the pumps in pump section 70, the same results is obtainable by using the bypass pipe 66 to divert a portion of the water from section A directly to sump 16 rather than flowing all of the water to sprays 58.

III. Winter Operation

During extreme cold weather conditions, it is possible and sometimes necessary to operate the cooling tower exclusively in the dry mode. Exclusive dry mode operation is as follows:

Either valve 40 or six-way valve 71 is set to direct all of the hot water from source V to cooling section A and thence from section A via valve 44 to the sump 16 so that the air in the tower will only be in contact with non-wetted surfaces.

The proper setting for the six-way valve is illustrated in FIG. 2c.

From the foregoing description, considered in view of the drawing, it will be seen by those skilled in this art that the aims and objects set forth herein and others are fully accomplished.

I claim:

1. A hot liquid cooling tower comprising a tower housing, means for directing air through the tower housing from its lower end upwardly, a first cooling section adjacent the upper end of the tower, first liquid spray means above said first cooling section, a second cooling section adjacent the lower end of the tower, second liquid spray means between the first and second cooling sections, a cooled liquid sump at the bottom of the tower housing, and valve means for selectively directing a source of hot liquid to be cooled to at least one of said first and second spray means, and first and second cooling sections.

2. The invention defined in claim 1 wherein said selectively directing means includes means for also directing liquid to the liquid sump.

3. A hot liquid cooling tower comprising a tower housing, means for directing air through the tower housing from its lower end upwardly, a first normally dry cooling section adjacent the upper end of the tower, first liquid spray means above said first cooling section, a second normally wet cooling section adjacent the lower end of the tower, second liquid spray means between the first and second cooling sections, a cooled liquid sump at the bottom of the tower housing, and valve means for selectively directing a source of hot liquid to be cooled to at least one of said first and second spray means, and first and second cooling sections.

4. A method of cooling a hot liquid comprising the steps directing cooling air generally upwardly through a confined zone and serial through first and second cooling sections, and passed first and second liquid spray means above each such first and second cooling stations, and selectively directing a liquid to be cooled to at least one of the first and second spray means, and first and second cooling sections.

5. The method defined in claim 4 wherein all the liquid to be cooled is directed to the first liquid spray means.

6. The method defined in claim 4 wherein all the liquid to be cooled is first directed through the first cooling section and then through the second spray means.

7. The method defined in claim 4 wherein all the liquid to be cooled is directed only through the first cooling section.

8. The invention defined in claim 1 wherein said valve means selectively directs hot liquid to be cooled to at least of one of said first spray means, second spray means, first cooling section and second cooling section to thereby provide for wet cooling, dry cooling or a combination wet and dry cooling.

9. The invention defined in claim 8 wherein the first cooling section includes a hot liquid conveying conduit within the tower and the external surface thereof comprises the heat exchange surface.

10. The invention defined in claim 9 wherein the liquid conveying conduit is finned to thereby increase the liquid-gas contact surfaces.

11. The invention defined in claim 1 wherein the means for directing air through the tower comprises at least one fan positioned above the first liquid spray means and means for eliminating mist from the air.

12. A hot liquid cooling tower comprising:
 a. a cooling tower housing;
 b. means for directing air upwardly through the tower;
 c. a conduit for circulating hot liquid within the tower housing;
 d. cooling surfaces adjacent the lower end of the tower housing;
 e. liquid spray means between the said conduit and the cooling surfaces;
 f. a cooled liquid sump; and
 g. valve means for selectively directing a source of hot liquid to the said conduit or the liquid spray means or to the said conduit and the liquid spray means.

* * * * *